United States Patent [19]

De Loye

[11] 3,891,793

[45] June 24, 1975

[54] BINARY CODING DEVICE

[75] Inventor: Martin De Loye, Paris, France

[73] Assignee: Compagnie Industrielle des Telecommunications Cit-Alcatel, France

[22] Filed: May 10, 1974

[21] Appl. No.: 468,980

[30] Foreign Application Priority Data

May 11, 1973 France ............................ 73.17087

[52] U.S. Cl. .................................................. 178/6
[51] Int. Cl. .......................................... H04n 1/40
[58] Field of Search ........................... 178/6, DIG. 3

[56] References Cited

UNITED STATES PATENTS

| | | | |
|---|---|---|---|
| 3,637,927 | 1/1972 | Krause | 178/6 |
| 3,715,475 | 2/1973 | Prause | 178/6 |
| 3,739,084 | 6/1973 | Heinrich | 178/6 |

*Primary Examiner*—Howard W. Britton
*Attorney, Agent, or Firm*—Craig & Antonelli

[57] ABSTRACT

Binary coding device for the facsimile transmission of pictures of a document. The voltage representative of each point of the document is compared with a variable reference signal sent out by a generator having a control circuit comprising a counting element whose variation is controlled by a clock conditioned by the signal coming from the comparator and the state of counting so that the reference voltage may vary cyclically, in steps, between two limit values as long as the signal coming from the comparator remains at a first logic level.

18 Claims, 5 Drawing Figures

BINARY CODING DEVICE

The present invention concerns facsimile systems. In these systems, a document to be reproduced at distance is scanned in a transmitter which sends out a sequence of electric signals in reply to the pictures or messages on the document. These electric signals are transmitted by a communication line, for example a telephone line, from the transmitter to a receiver in which the electric signals received ensure the controlling of marking elements for the reproducing of the scanned document. It must be understood that a synchronization is effected between the "reading" of the document at the transmitter and the reconstitution of the document at the receiver.

The present invention relates more particularly to the coding of the data contained in the scanned document, to be transmitted towards the receiver set for their reconstitution.

In a transmitter set of a known type, the document is scanned by successive elementary points; the scanning of the document may be effected by a photoelectric device and the data contained in the scanned document may be transmitted in a sequence of intervals having identical short periods. The facsimile transmission may be effected by coding at two levels of the data in the document thus scanned in time; that coding by a hit-or-miss process enables, however, only a black-and-white reproduction of the document, this resulting in a loss of data with respect to the half-tones contained in the document, assimilated to black or white coloring.

The reproduction of half-tones contained in the document to be transmitted is obtained in a known way, by coding, in the transmitter set, by an $n$-bit word of the light intensity of each elementary point examined. It is evident that this solution leads to a considerable volume of binary elements to be transmitted towards the receiver set. For a document containing N scanned elementary points, that volume of binary elements, or bits, will be 2 N bits for four tones (black, white and two half-tints); it will be 3 N bits for eight tones (black, white and six half-tints) and, in a general way, $n$.N bits for $2^n$ tints. At the receiver set, a suitable decoder must be provided to reconstitute the N points examined starting from the sequence of bits received forming the N binary words having 2,3 . . . or $n$ bits.

Besides the fact that this solution leads to a coding device and to a decoding device which are complex, respectively in the transmitter set and in the receiver set, it increases the working expenses of the facsimile installation, requiring a long link time, by the telephone line, between the transmitter and the receiver and/or it leads to a loss of definition on all the tints when a maximum number of bits to be transmitted is imposed by the band-width of the link.

The present invention aims at avoiding these disadvantages by making it possible to effect a transmission of pictures of documents comprising several half-tints by a simple binary coding, easy to bring into effect and not very expensive to use for operating the facsimile installation.

The present invention has for its object an evolutive binary coding device for transmitting data contained in a document in n different tints to be reproduced, more particularly in a facsimile installation, comprising a comparator receiving a signal representative of the tint of each elementary point of the document, examined by a scanning device, and a comparison signal, characterized in that the comparison signal is sent out by a variable generator controlled by a counting device connected, through a logic control assembly, to a clock which makes its counting state vary from a first determined state towards a second determined state, for controlling an evolution, step-by-step and in the same direction, of the reference signal from a first determined level to a second determined level as long as the output signal of the said comparator remains at a first logic level and for ensuring the resetting of the counting device to the said first state when the said output signal of the comparator assumes the second logic level or when the second determined state of the said counting device is decoded.

According to the present invention, the evolution of the said comparison signal is controlled in steps, from the first level equal to the lower threshold of the voltage which is representative of a point of black tint or tint close to black, towards a second level equal to the upper threshold of the voltage which is representative of a white point, to obtain a signal having a level of 1 at the output of the comparator for each examined point whose representative voltage is higher than the level of the comparison signal applied simultaneously, the comparison signal being brought back to the said first level for any binary signal whose level is 1 coming from the comparator, or periodically after any comparison with the second level of that comparison signal.

Other characteristics and advantages of the present invention will become apparent from the description given hereinbelow with reference to the accompanying drawing in which:

FIG. 1 shows the block diagram of a facsimile installation comprising the coding device according to the invention, making it possible to explain the general principle brought into play by the coding device.

Figure 1:
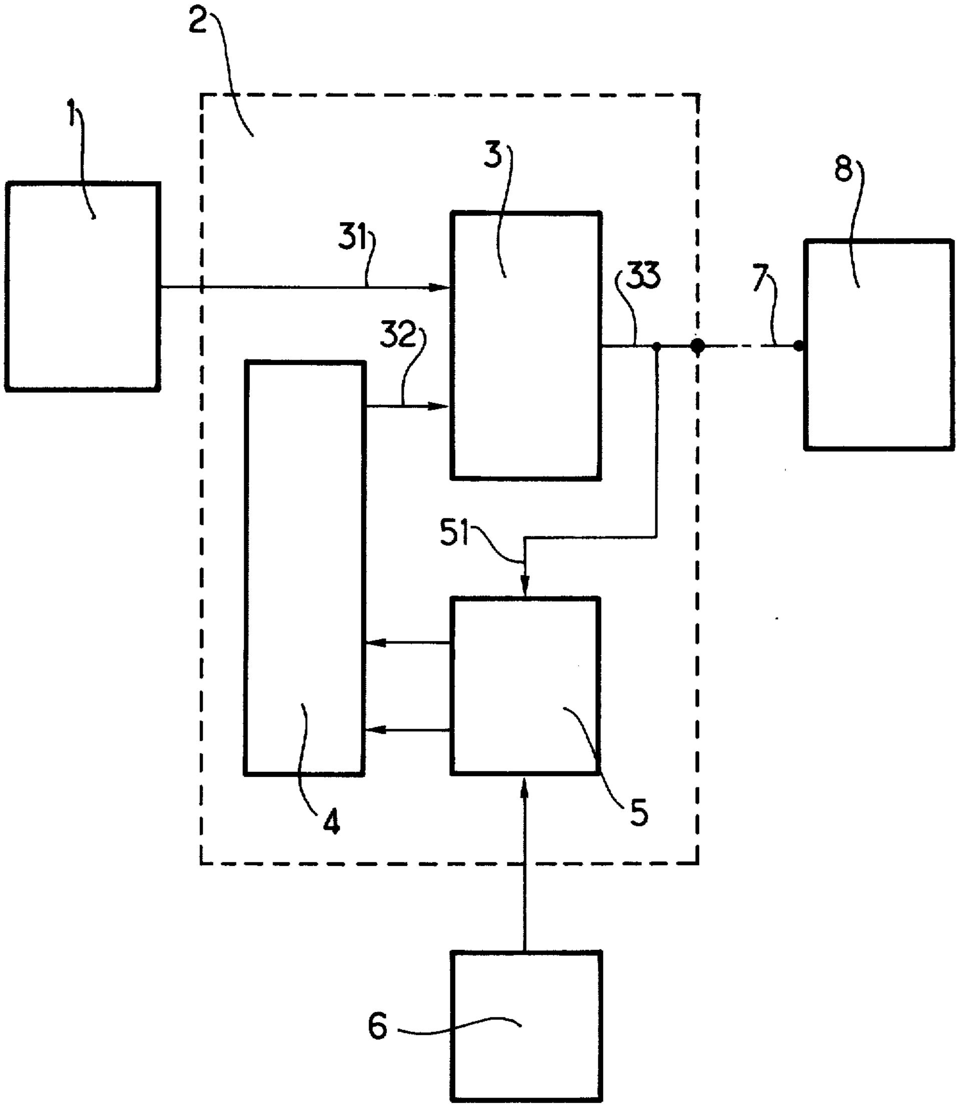
FIG. 1 shows the block diagram of a facsimile transmitting installation comprising the coding device according to the invention.

The installation comprises a device 1 for scanning point-by-point a document to be transmitted; that scanning device 1 is, for example, of the photoelectric type; it converts the light intensity of the point examined into an electric signal having a voltage proportional to that light intensity. The electric signal coming from the scanning device is applied to a binary coding device 2 equipping, along with the scanning device 1, a transmitter set.

That coding device 2 comprises a comparator 3 with a first input 31 connected to the output of the scanning device 1. A second input 32 of the comparator 3 is connected to a threshold generator 4, capable of sending out a comparison signal having a value which may vary among several defined values or thresholds, in response to the output signals of a control circuit 5. That control circuit 5 is essentially constituted, as will be described hereinbelow, by a counter whose state is itself controlled by a clock 6 synchronized with respect to the step-by-step scanning of the document by the device 1. The function of that control circuit 5. of the type for counting the clock pulses, is to control the evolution of the value of the threshold sent out by the generator 4 at each of the successive instants of the clock 6, as a function of the state assumed by the counter of the circuit 5, so that this evolution be effected step-by-step by increasing valules and/or decreasing value starting from a value chosen among the various possible values of these thresholds, called the reference threshold value. A connection 51, between the output 33 of the comparator 3 and the control circuit 5, ensures the setting of the control circuit 5 to a predetermined original state for which the threshold generator 4 sends out the said reference threshold value. That setting to the original state of the control circuit 5 is effected by the connection 51 either when a pulse is obtained at the output 33 of the comparator 3 for an evolution by decreasing values of the threshold starting from the reference value, or when no pulse is applied to that output 33 of the comparator 3 for an evolution by increasing values of the threshold starting from that reference value.

Moreover, the setting of the circuit 5 to its original state may also be obtained respectively by one or the other of the two states of the counter for which the lower threshold limit value or upper threshold limit value is reached.

The output 33 of the comparator 3 is connected by a connection 7, for example a telephone line, to a receiver set constituted by a device 8 for receiving the data transmitted and for reconstituting the document scanned in the transmitter set; in this device, the decoding circuit is of a known type, such as that used in hit-or-miss type transmission systems.

The general principle of the binary coding device 2 is based on an evolutive coding, coming from the step-by-step scanning of the document to be transmitted, according to which each black point examined will be transmitted in the form of a signal having the value 1; each white point examined will be transmitted in the form of a signal having the value 0; whereas each examined point having an intermediate tone will not be transmitted individually, but a sequence of such points having an intermediate tint will be transmitted by a sequence of signals having a binary value of 0 and 1 according to an allocation to which variable numbers of black and white points giving the overall tone to be transmitted would correspond.

The operation of the evolutive coding device is as follows:

The voltage representative of an examined point applied at 31 is compared with the reference threshold value applied originally at 32.

If the level of the signal at 31 is lower than that threshold reference value, the output 33 of the comparator 3 is at the logic value 0, the point examined will be read as being white. The voltage representative of the following examined point is then compared with the threshold whose value is directly lower than calculated under the control of the circuit 5 receiving the first clock pulse; if that voltage is still less than that threshold, the point considered is also read as being white. The voltage representative of the new examined point will be, according to the same process, compared with a new threshold having a lower value.

If a voltage representative of an examined point is higher than the threshold value applied at that instant to the comparator 3 (that threshold being lower than the reference value), the output 33 of the comparator 3 assumes the logic value 1, that examined point is interpreted as being black. The output signal at 33, having a logic value of 1, controls the resetting of the circuit to its original state for which the threshold applied at 32 will assume the reference value.

An evolution of the value of the threshold towards the upper limit value may be effected according to a similar process. That process for the evolution by increasing values of the applied threshold will be effected as long as the voltage representative of the examined point is greater than the applied threshold, that is, when the output signal 33 is at the level 1 for which a black point is read. The appearance of an output signal at 33 of a signal whose level is 0, for which a white point is read, will cause the resetting of the circuit 5 back to its original state and the reference value will be applied to the input 32. The arrival of the state of the circuit 5 at a definite state for which the value of the applied threshold is the upper limit value of the threshold also brings that reference threshold value back to 32.

Figure 2:
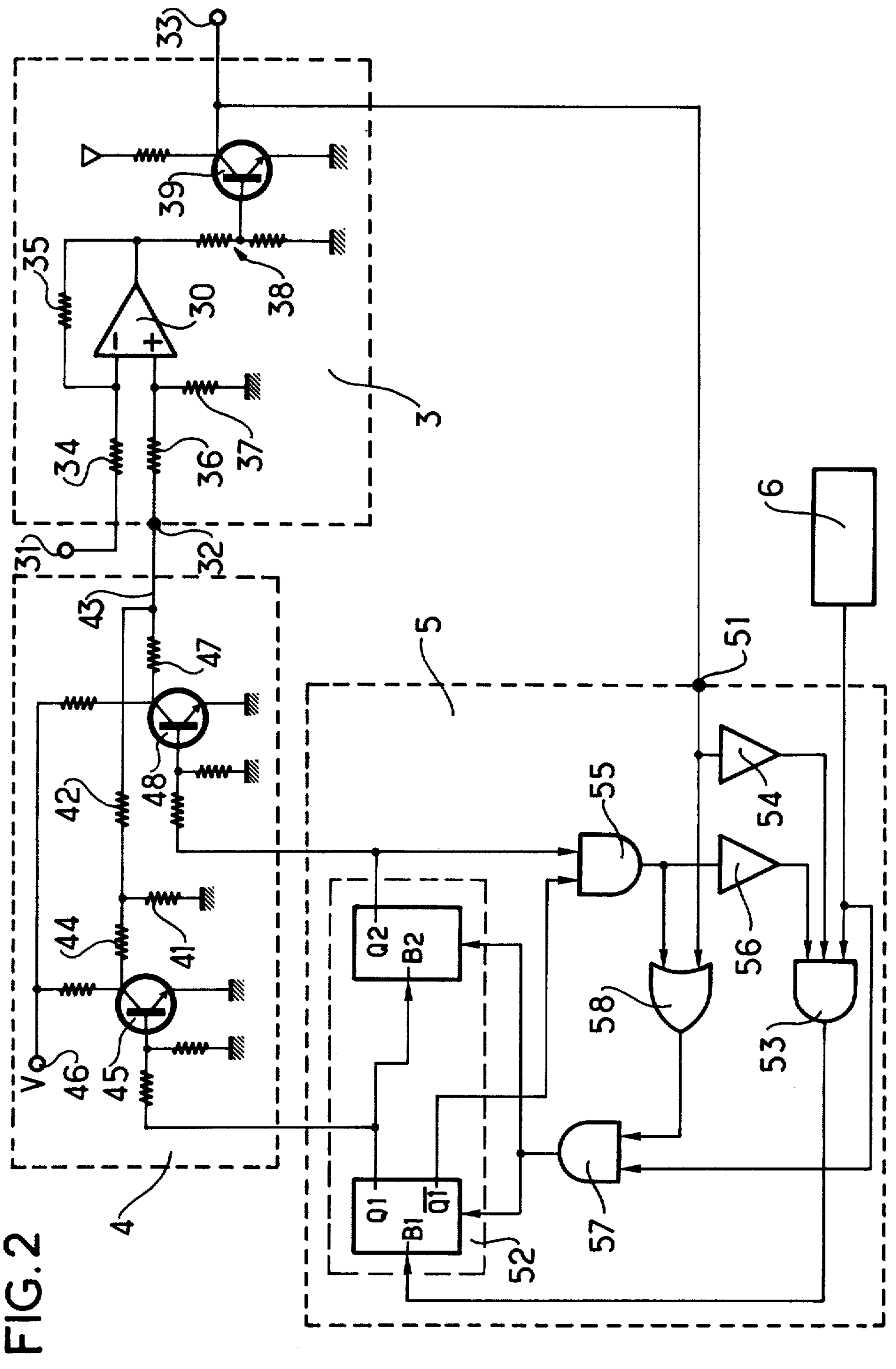
FIG. 2 shows a particular embodiment of that coding device for data transmission having four levels of tints.

FIG. 2 shows an embodiment of the coding device 2 according to the invention enabling the transmission in binary form of data intended for ensuring the reproducing of four different tones of the examined document. That FIG. 2 shows again the three circuits in FIG. 1, namely, the comparator 3, the threshold generator 4 and the circuit 5, controlling the evolution of the threshold 11 at the output of the generator 4.

The threshold generator 4 is constituted by a resistive network connected with voltage switching transistors connected up as switches. The threshold generator 4 comprises a first resistor 41 having a value of 2R, connected up to ground on the one hand and on the other hand in series with a second resistor 42 having a value of R, to an output 43 which is connected up to the input 32 of the comparison device 3. It comprises, moreover, a third resistor 44 having a value of 2R, connected up on the one hand to the common point of the resistors 41 and 42 and on the other hand to a first switching transistor 45 connected up as a switch between a terminal 46 brought to a potential V and ground and controlled by voltage levels applied to its base by the control circuit 5 of the counting type. It comprises, moreover, a fourth resistor 47 having a value of 2R, connected on the one hand to the terminal of the resistor 42 on which is formed the output 43 and on the other hand to a second switching transistor 48 connected up as a switch between the terminal 46 at the potential V and ground and controlled by levels coming from the control circuit 5 applied to its base. Polarization resistors which are not referenced, having a low value with respect to R, are connected with the transistors 45 and 48, as is well known.

The threshold generator 4 makes it possible to obtain, under a source impedance having a constant value R, at the output 43, the following values:

If the transistors 45 and 48 are saturated by the voltage levels coming from the control circuit 5, the potentials on the collectors of these transistors are substantially zero and the voltage at the output 43 is zero;

If the transistor 45 is blocked and the transistor 48 is made conductive by the voltage levels coming from the control circuit 5, the collector of the transistor 45 is substantially at potential V and the collector of the transistor 48 is at ground potential and the output 43 is then brought to V/4;

If the transistor 45 is saturated and the transistor 48 is blocked by the control circuit 5, the output 43 is brought to V/2;

If the two transistors 45 and 48 are both blocked by the control circuit 5, their collectors are at potential V and the output 43 is brought to the potential 3 V/4.

Evidently, the suitable choice of the resistances and of the voltage V enables the possible levels of the signal at 43 to be adjusted, from a first maximum level, N1, to a second lower level, N2, then to a third level, even lower, N3, down to the zero level 0, in relation to the possible limit values of the representative signal of each of the examined points of the document.

The comparator 3 is constituted by a differential amplifier 30. The input 31 of the comparator 3 receives the voltage coming from the reading of the document (scanning device 1 in FIG. 1) and the input 32 receives the threshold voltage sent out on the output 43 of the threshold generator 4.

The input 31 of the comparator is connected to the negative input of the differential amplifier 30 through a first resistor 34 having a value of R/3, a second resistor 35 having a value of 2 R/3 is connected up between that negative input and the output of the amplifier 30. The input 32 of the comparator 3 is connected up to the positive input of the amplifier 30 through a third resistor 36 having a value of R/3; a fourth resistor 37 having a value of 2 R/3 connected up to ground is also connected up to that positive input. The differential amplifier 30 supplies, at its output, a voltage proportional to the difference between the voltages applied at 31 and 32. The values of the resistors 34 to 37 are here chosen so as to have an amplifier with great stability. The output of the differential amplifier is connected through a resistive divider 38 to the base of an NPN transistor 39 whose emitter is connected to ground, the collector of that transistor 39 being connected to a polarization source and forming the output 33 of the comparator 3.

The control voltage applied to the base of the transistor 39 blocks or saturates it with the signal appearing at the output 33 assuming the logic value 1 (level of the polarization source) when the analog reading voltage at 31 is greater than or equal to the threshold at 32 and the signal at 33 assuming the logic value 0 when the analog reading voltage applied at 31 is less than the threshold voltage applied at 32.

The control device 5 ensuring the evolution of the thresholds supplied at the output 43 of the generator 4 comprises a binary counter 52 formed by two master-slave flip-flops B1 and B2.

The input of that counter is formed by the input of the flip-flop B1; the input of the flip-flop B2 is connected up to the output Q1 of the flip-flop B1.

The advance of that counter 52 is controlled by a first AND gate 53 having a first input connected up to the clock 6, a second input connected up through an invertor 54 to the control input 51 (FIG. 1) connected up to the output 33 of the comparator 3 and a third input connected up to the output of a second AND gate 55 through an invertor 56. The AND gate 55 is used for decoding the binary state 10 of the counter 52; it has a first input connected up to the output $\bar{Q}1$ of the flip-flop B1 and a second input connected up to the output Q2 of the flip-flop B2.

An AND gate 57 is used for the setting back to zero of the flip-flop B1 and B2 of the counter 52. It has two inputs, the one connected to the clock 6, the other connected to the output of an OR gate 58. That OR gate 58 receives the output signal of the AND gate 55 for decoding the binary state 10 of the counter 52 and the signal at 51 coming from the output 33 of the comparator 3.

The general operation of the counter 52 with its flip-flops B1 and B2 is as follows:

As long as the output 33 of the comparator 3 is at the logic level 0 (examined point read as being white) and the binary state 10 of the counter 52 is not decoded by the AND gate 55, the AND gate 53 enables the advance by one step of the state of the counter 52 at the level changing of the input signal of the counter, that is, on the negative front of the pulse received from the clock 6 (the inputs of the flip-flops B1 and B2 connected up as master-slave elements being originally at the logic level 1).

When the binary state 10 is reached by the counter 52, or the output 33 of the comparator 3 is at the logic level 1 (examined point considered as black), the AND gate 53 is blocked for the pulses of the clock 6; simultaneously, the AND gate 57 is made conductive for the pulses of the clock 6, by the output of the OR gate 58 (logical 1), the rising front of that first clock pulse crossing through the AND gate 57 setting the outputs Q1 and Q2 of the flip-flops back to zero.

Figure 3:
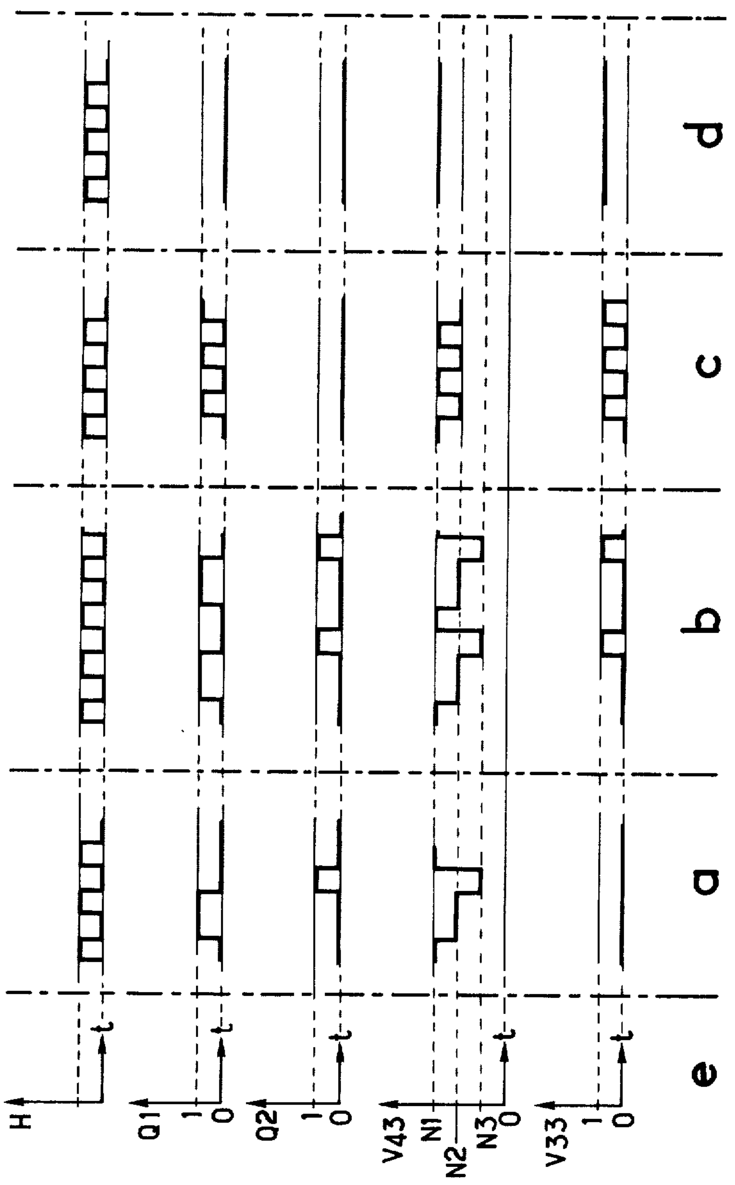
FIG. 3 shows the sets of diagrams explaining the operation of the device according to FIG. 2.

The operation of the device as a whole according to FIG. 2, for the transmitting of data in binary code representing for tints is given with reference to FIG. 3. That FIG. 3 comprises four assemblies of diagrams *a*, *b*, *c*, *d*, representing at the time of successive pulses H of the clock 6, the evolution of the threshold at the output of the generator 4 for the transmitting of the four tints considered (black, dark grey, light grey, white) in the form of binary signals obtained at the output of the comparator 3. The scales of the signals H, Q1 and Q2, V43, V33 given in time at the outputs of the clock 6, of the flip-flops B1 and B2 of the counter 52, of the threshold generator 4 and of the comparator 3, have been shown on the left at *e*, it being possible for the signal V43 to assume the three values N1, N2, N3 greater than zero giving the lower limit threshold of black, of dark grey and of light grey, any examined point having a representative voltage lower than N3 being white.

In these sets of diagrams, the level N1 is taken as the reference threshold value (or level of black) for which the counter 52 is at zero (Q1 = Q2 =0), and the evolution of the threshold is controlled by the counter 52 by steps towards the decreasing values. For all these sets of diagrams, the counter 52 is considered originally at zero and, the output 43 of the threshold generator 4 is therefore set to N1 by the two blocked transistors 45 and 48.

The set of diagrams a corresponds to a white zone examined on the scanned document in synchronism with the pulses H of the clock 6, whose representative voltage is below N3.

At the first pulse H of the clock 6, the level N1 for comparison with the representative voltage of the white zone examined sets the output of the comparator 3 to 0 (V33 =0). On the descending front of that first pulse H, the output Q1 changes over to 1; the output Q2 remains at 0: the transistor 45 is saturated; the transistor 48 remains blocked and the signal V43 changes over from reference threshold level N1 to the threshold level N2. The voltage representative of white examined during the second clock pulse H remains less than N2; the signal V33 at the output of the comparator remains at 0. The descending front of that second pulse H makes the output Q1 tilt from 1 to 0; the input of the flip-flop B2 therefore changes over to 0 and sets the output Q2 to 1. The transistor 45 becomes blocked; whereas the transistor 48 becomes conductive; the output signal V43 of the generator 4 therefore changes over from the level N2 to the level N3; the signal V33 remains at zero.

The binary state 10 of the counter 52 decoded by the AND gate 55, blocks, through the invertor 56, the AND gate 53 for the advance of the state of the counter 52 but makes the AND gate 57 conductive for the third clock pulse. The counter 52 is reset to zero; the outputs Q1 and Q2 of the flip-flops are at 0 and the threshold at 43 resumes the maximum level N1 and a new counting cycle is effected.

The use of a cyclic binary counter having three possible states (00, 01, 10) causes the device not to maintain itself at the sensitivity level N3 defining the maximum threshold of white and is thus made not very sensitive to the ground level of the examined document.

The set of diagrams *b* corresponds to an examined zone with a light grey tone whose representative voltage is between N2 and N3. The comparison of the representative voltage of light grey, at the time of the first pulse H of the clock 6 and of the level N1 of the reference threshold applied to the output 43, gives a signal V33 equal to 0. On the descending front of that first pulse H, the output Q1 of B1 changes over to 1; the threshold level V43 changes over from N1 to N2. The comparison signal at the output 33 remains at 0 during the arrival of the second clock pulse H. The descending front of that second pulse makes the state of the counter 52 advance by one step; the output Q1 of B1 changes to 0; the output Q2 of B2 changes to 1, this causing, at the output 43, the changing of the threshold to the level of N3. That change to the level N3, lower than the voltage of the examined point, sets the output 33 of the comparator to the value 1. At the third clock pulse H, and AND gate 53 becomes blocked by the output of the invertor 54; on the other hand, the OR gate 58 is conductive and unblocks the AND gate 57, resetting to zero the flip-flops B1 and B2 which make the output 43 of the threshold generator change back to the level N1.

The set of diagrams *c* corresponds to a dark grey examined zone whose representative voltage is comprised between N1 and N2.

At the first pulse H of the clock 6, the representative voltage of dark grey is compared at the reference threshold level N1 existing at 43 (the counter being at zero). The output V33 of the comparator 3 is at the value 0. The output Q1 of the flip-flop B1 assumes the state 1 on the descending front of that first pulse making the signal at the output 43 of the threshold generator 4 change over to the level N2, the output 33 of the comparator 3 then assuming the value 1. At the second pulse H of the clock, the AND gate 53 is blocked; the AND gate 57 is conductive for the output signal of the OR gate 58 and the counter is reset to zero on the rising front of that second pulse H and the level of the threshold at 43 returns to N1. That same process is then repeated. In this case, the output Q2 of the flip-flop B2 remains at 0.

The assembly of diagrams *d* corresponds to an examined black zone whose representative voltage is higher than N1.

The counter 52 is at zero and the original signal V43 is at N1. The comparison of the representative voltage of black and of the level N1 sets the output 33 of the comparator 3 to 1. The first pulse H corresponding to that same first examined point crosses through the AND gate 57, made conductive by the OR gate 58 receiving V33. The flip-flops B1 and B2 remain at 0 and that same process is repeated for following black points.

These diagrams in FIG. 3 show that the surface constituted by a sequence of black points or by a sequence of white points will be reproduced with the definition given at the scanning; whereas surfaces having intermediate tints undergo a loss of definition. Thus, this device forms a point pattern according to which a black or a white is interpreted as it stands, and is transmitted by as many signals 1, or respectively, as elementary points examined successively in the black or white surfaces; whereas a dark grey is interpreted as a repeated sequence of a black point and of a white point and light grey point as a repeated sequence of a black point and of three white points, the successive points in these two tints are retransmitted by as many corresponding signals (0 1 0 1 0 . . . or 0 0 0 1 0 0 0 1 0 . . . ).

The eye, which integrates the intensity of each of the zones reconstituted, makes it possible to obtain that impression of half-tints. It will be observed that this device tends to return to the threshold of black N1, chosen as the reference value, to which corresponds an operation ensuring a reproduction with a high definition.

Figure 4:
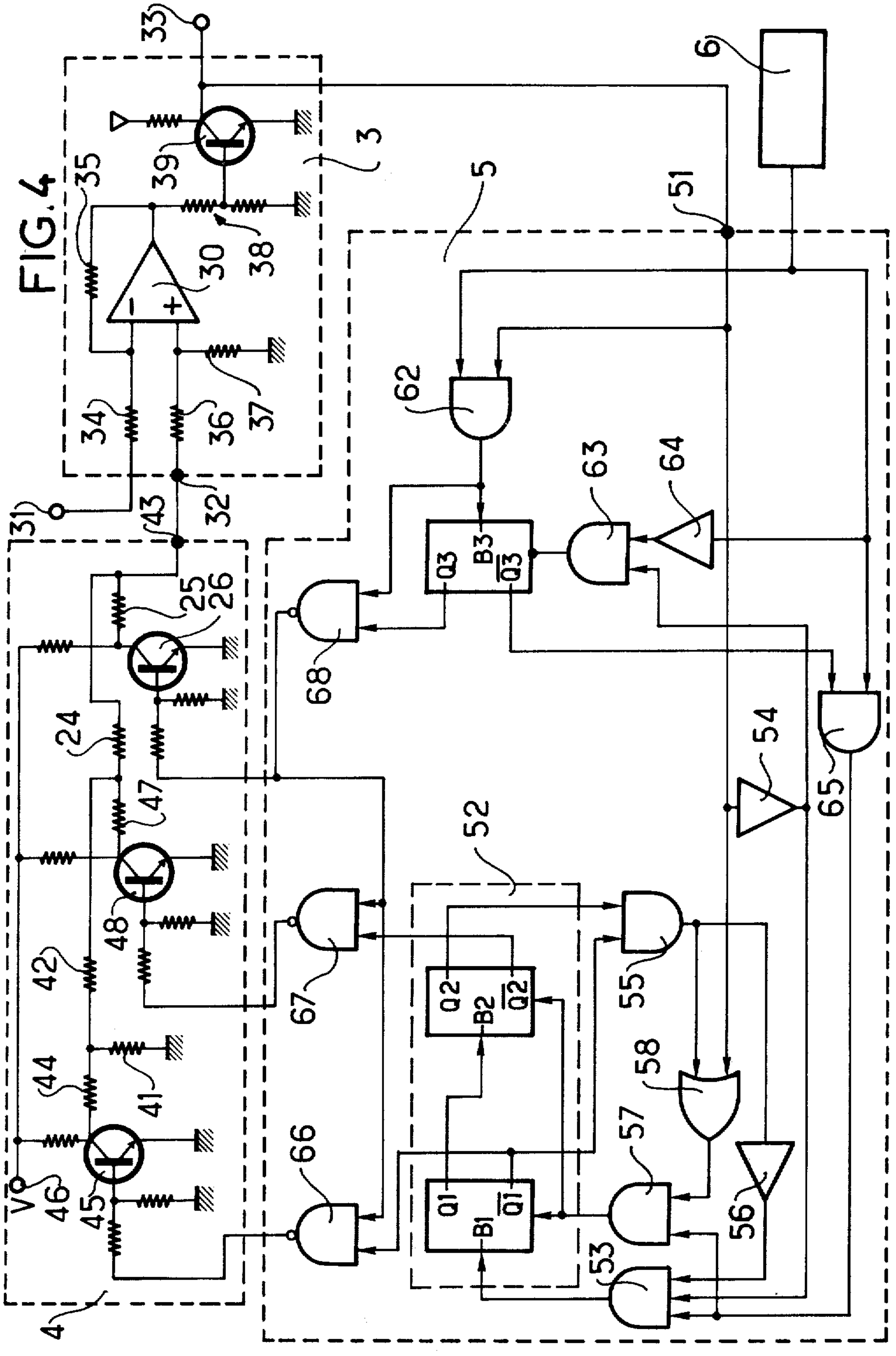
FIG. 4 shows an embodiment of the coding device for data transmission having five levels of tints.

FIG. 4 shows a coding device enabling the reconstitution of five levels of tones, that device operating with four thresholds or comparison levels. This coding device is in compliance with the one illustrated in FIG. 1. To simplify the description of the embodiment according to FIG. 4, the elements which correspond to those in FIG. 2 are designated by the same reference numerals.

The threshold generator 4 comprises, besides the resistive network formed by the resistors 41, 42, 44 and 47 according to FIG. 2 and connected with the two switching transistors 45 and 48 controlled in saturation or in blocking, a resistor 24, whose value is R, a resistor 25 whose value is 2R and a third transistor 26 connected up as a switch, inserted between the resistor 47 and the output 43. The transistor 26 is controlled in saturation or in blocking by a signal sent out by the control circuit 5 applied to its base. The emitter of that transistor 26 is connected to ground; its collector is connected up through the resistor 25 to the output 43. The resistor 24 is connected up between the common point of the resistors 42 and 47 and the connection of the resistor 25 to the output 43. Such a threshold generator circuit 4 makes it possible to obtain by various control combinations for controlling the three transistors, eight different threshold levels among which four levels will be used as described hereinafter for the distinguishing of five different tints of the scanned document to be reproduced.

The comparator 3 is identical to the one in FIG. 2.

The control circuit 5 comprises, besides the counter 52 formed by the flip-flops B1 and B2 connected up as master-slave flip-flops and the logic gates 53 to 58 connected therewith, a third flip-flop B3 whose input is connected to the output of an AND gate 62.

The AND gate 62 receives the clock pulses 6 and the signal coming from the input 51 of the control circuit 5. The resetting to zero of that flip-flop B3 is insured by an AND gate 63 receiving on the one hand, the pulses of the clock 6 through an invertor 64 and on the other hand the signal coming from the invertor 54 connected to the input 51 of the control circuit 5; that resetting to zero of the flip-flop B3 will be effected on the descending fronts of the pulses of the clock 6. The circuit comprises an extra AND gate 65 inhibiting the advance of the couner 52 having flip-flops B1 and B2 during the operation of the flip-flop B3; that AND gate 65 is interposed on the connection between the clock 6 and the AND gates 53 and 57.

The connections between the outputs of the counter 52 and the threshold generator 4 are slightly modified in relation to the circuit in FIG. 2. The output $\bar{Q}1$ of the flip-flop B1 of the counter 52 is applied for controlling the transistor 45 of the threshold generator 4, through a first NAND gate 66; the output $\bar{Q}2$ of the flip-flop B2 controls the transistor 48 through a second NAND gate 67. The transistor 26 is controlled by the output of a third NAND gate 68 receiving the signals applied to the input and sent out at the output Q3 of the flip-flop B3. That output signal of the NAND gate 68 is also applied to a second input of each of the two NAND gates 66 and 67.

The operation of the circuit in FIG. 4 is given hereinafter taking into account the state of the flip-flops B1, B2 and B3 controlling the threshold generator 4.

The counter 52 is a cyclic binary counter counting in cycles of three; it enables the evolution, in a same direction (here, in decreasing values) of the threshold at the output 43 of the threshold generator 4, starting from a reference threshold value, for the three state (00, 01, 10) which it may assuem. The flip-flop B3 associated with that counter 52 enables an evolution by one step in the reverse direction (in increasing values) of the threshold at the output 43 of the generator 4 starting from that reference threshold value.

Figure 5:
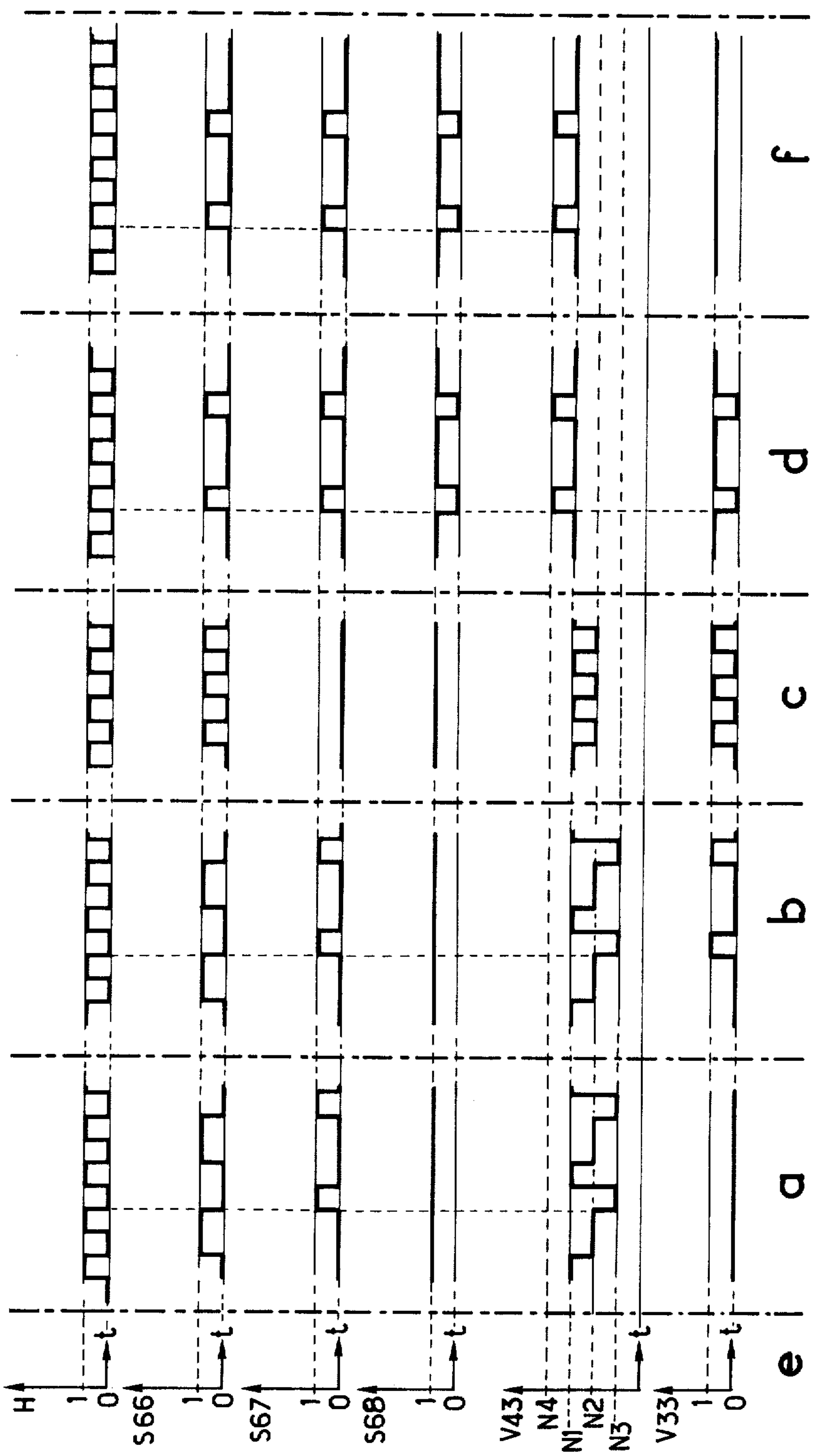
FIG. 5 shows the sets of diagrams explaining the operation of the device according to FIG. 4.

The diagrams in FIG. 5 are given to explain that operation. The sets of diagrams *a* to *d* and *f* represent the output signals of S66, S67 and S68 of the control circuit 5, the corresponding evolution of the threshold at the output 43 of the generator 4 and the signal V33 at the output of the comparator 3; the scales of these signals are given in *e* as a function of time.

For these sets of diagrams, the counter 52 having flip-flops B1 and B2 and the flip-flop B3 are originally at zero; the output of the NAND gate 68 is at 1; the outputs of the NAND gates 66 and 67 are at 0. The transistors 45 and 48 are then blocked; the transistor 26 is conductive; the output 43 of the threshold generator 4 will assume a value V/4 + V/8 constituting the reference threshold value.

It will be assumed, in the first instance, that the input 51 remains at zero in order to block at zero the flip-flop B3 whose output $\bar{Q}3$ at 1 makes the AND gate 65 conductive for the advance of the counter 52 by the pulses coming from the clock 6. When the counter 52 advances by one step, on the descending front of the pulse of the clock 6, the output $\bar{Q}1$ of the flip-flop B1 passes from 1 to 0, this making a 1 appear at the output of the NAND gate 66, making the transistor 45 conductive. The transistor 48 remains blocked; the transistor 26 is conductive; the output 43 then assumes the value V/4.

On the descending front of the pulse of the clock 6, the counter 52 advances again by one step and makes the output $\bar{Q}1$ change over to the state 1; whereas the output $\bar{Q}2$ changes over to 0. The output of the NAND gate 66 assumes the value 0; the NAND gate 67 assumes the value 1. The transistor 45 will then be blocked; the transistor 48 will be conductive; the transistor 26 will be kept conductive; the output 43 of the threshold generator 4 will assume the value V/8.

On the arrival of another clock pulse, the state of the counter 52 detected by the AND gate 55 resets to zero the flip-flops B1 and B2 by the AND gate 57, on the rising front of that third clock pulse; the output of the threshold generator 4 assumes the reference threshold value, that is, V/4 + V/8.

The resetting to zero of the counter 52 may also be caused before the arrival of the output Q1 of the flip-flop B1 at 0 and of the output Q2 of B2 at 1. The appearing of a signal whose value is 1 at the input 51 of the control circuit 5 sets the output of the OR gate 58 at 1 and makes the AND gate 57, for resetting the counter 52 to zero, conductive for the following pulse of the clock 6. The resetting to zero of the counter 52 is effected on the rising front of that clock pulse; the outputs Q1 and Q2 are at 0.

It will be observed, moreover, that when the input 51 is at 1, the AND gate 62 is conductive for the clock pulses H. On the descending front of that first clock pulse, the output Q3 changes over from the state 0 to the state 1; $\bar{Q}3$ is then at 0 and blocks the AND gate 65 which applies a 0 to the corresponding input of the AND gate 53. The input of the flip-flop B3 is a 0 until the arrival of the second clock pulse so that the output of the NAND gate 68 changes over from 1 to 0 only on the rising front of that second clock pulse. Simultaneously, the transistor 26 becomes blocked; whereas the output of the NAND gate 68, logical 0, makes the outputs of the NAND gates 66 and 67 change over to 1, making the transistors 45 and 48 conductive. The threshold generator then sends out at the output 43 a signal V/2. If the input 51 of the control circuit 5 remains at 1, the output Q3 of the flip-flop B3 tilts from 1 to 0 on the descending front of that second clock pulse applied to its input; if the input 51 changes over to 0, the resetting to zero of the flip-flop B3 is ensured by the AND gate 63 made conductive on the arrival of the descending front of that second clock pulse. Thus, the output Q3 assuming the value 0, the output of the NAND gate 68 is at 1 and the outputs of the NAND gates 66 and 67 are at 0; for these values, the threshold generator 4 sends out at 43 the reference threshold value V/4 + V/8.

A counting of the clock pulses by the flip-flops B1 and B2 may begin if the input 51 is at 0 (the AND gates 65 and 53 then being conductive), or a further tilting of the output Q3 of B3 will take place if the input 51 remains at 1.

Obviously, during the operation of this device, the threshold levels V/2, V/4 + V/8, V/4 and V/8 obtained at the output of the threshold generator 4 correspond respectively to the limit voltages representative of the tints to be reproduced. In the diagrams in FIG. 5, these levels are designated respectively by N4, N1, N2 and N3, among which N1 is the reference threshold value evolving in decreasing values down to N3 to represent an evolution of the tints of from medium grey to light grey and to white and being able to evolve in increasing values to N4 to represent the evolution from dark grey to black.

The explanation of the diagrams in FIG. 5 is completed hereinafter.

In the set of diagrams *a*, a white zone on the scanned document whose representative voltage is less than N3 has been taken into consideration.

The evolution of the thresholds at the output 43 of the generator is effected from N1 to N3 by the advance of the counter 52 alone from the state 00 to the state 10, these states assumed by the outputs Q2 and Q1 being observed again at the outputs of the NAND gates 67 and 66 each having an input brought to 1 connected to the NAND gate 68.

In this case, the output signal of the comparator 3 remains at 0 and represents a white point.

In the set of diagrams *b*, a light grey scanned zone, having a representative voltage comprised between N2 and N3 has been taken into consideration. The evolution of the counter 52 is identical with the preceding case but the resetting to zero of that counter 52 on the arrival of the state 10 is effected both by the AND gate 55 decoding that state only by the presence of a signal 1 at the output 33 of the comparator 3 when the threshold at 43 assumes the value N3.

In the set of diagrams *c*, a medium grey scanned zone, having a representative voltage comprised between N1 and N2 has been taken into consideration. In that case, the counter 52 changes over from the state 00 to the state 01 for which the threshold at 43 changes over from N1 to N2. The arrival at 43 of the threshold N2 sets the output 33 of the comparator to 1 and makes the counter 52 change over to 0.

In the set of diagrams *d*, a dark grey zone having a representative voltage comprised between N1 and N4 has been taken into consideration. The counter 52 cannot receive any clock pulse due to the presence of a signal 1 at the output 33 of the comparator which blocks, by the invertor 54, the AND gate 53. That signal 1 makes the AND gate 62 conductive and the output of the flip-flop B3 changes over to 1 on the descending front of that first clock pulse. The coincidence of that signal 1 on Q3 with a signal 1 at the output of the AND gate 62 during the second clock pulse, makes the signal V43 change over to the level N4. The output of the comparator resumes the value 0, resetting the flip-flop B2 to 0 (AND gate 63 conductive as soon as the negative front of that second clock pulse arrives) and the signal V43 to N1. That same process of evolution of the output of the flip-flop B3 and of the threshold V3 is repeated.

In the assembly of diagrams *f*, a black scanned zone having a representative voltage greater than N4 has been taken into consideration. The counter 52 remains at zero, the AND gate 53 being blocked by the signal V33 for the comparison of that representative voltage and of the level N1 of the reference threshold. The levels assumed by the output of the flip-flop B3 and the output 43 of the threshold generator evolve in the same way as in the preceding case (the output Q3 of B3 here being reset to zero by the clock pulses received by the gate 62 which is conductive for these pulses). The output of the comparator remains at 1.

The device according to this invention constitutes element transmitting, for a sequence of elementary points examined, a variable number of signals 1 (to which correspond respectively black points on reproduction) as a function of the tint of the examined points. This device has, more particularly the following great advantages:

It does not increase the number of bits to be transmitted, in the examining of N points, with regard to a coding device for two tints; the transmitting of N corresponding data items with n tints is effected with a volume of N bits;

The decoder for reconstituting the data transmitted is of the conventional type operating on a hit or miss basis;

The definition of the black and white tints at the restitution is that given by the scanning; a loss of definition at the restitution occurs only on intermediate tints, this being only slightly detrimental to the restitution of data.

The present invention has been described with reference to two particular embodiments given by way of an example; it is evident that, without going beyond the scope of this invention, these diagrams of embodiment may be modified, replacing certain means by other equivalent means or changing details therein. It is likewise evident that these circuits may be adapted to enable the binary coded transmission of data to be reproduced in a different number of tints.

What is claimed is:

1. A device for the binary coding of data on a document to be reproduced with different tints comprising scanning means for scanning a document by successive elementary points to generate an analog reading voltage for each point examined, generating means for generating a variable comparison voltage, said generating means being connected with a control means, and comparison means for comparing said analog reading voltage and said variable comparison voltage, said comparison means generating a binary 0 or 1 signal from the comparison, said control means including a binary counter connected with a control clock synchronized with the scanning element, and a logic means for connecting said clock to said binary counter, said logic means comprising first means for controlling the evolution of the counter from a first state up to a second state, said first means receiving a first binary signal from said output binary comparison signal of said comparison means, second means for ensuring the forced setting of said binary counter to said first state, and third means for controlling said second means through an OR gate to ensure the coding of said second state of said binary counter, said second means further controlling said binary counter upon the appearance of a second binary comparison signal at the output of said comparison means by controlling the evolution of said variable comparison voltage between a first predetermined level and a second predetermined level corresponding respectively to said first and second states of said binary counter.

2. A device according to claim 1, wherein said binary counter includes at least two flip-flops connected at a master-slave unit controlling a step-by-step variation in decreasing values of said variable comparison voltage startng from said first level up to said second level corresponding to the maximum threshold of the representative voltage of a white tint, thereby enabling coding of data with at least four different tints.

3. A device according to claim 2, wherein said first means for controlling the evolution of said binary counter comprise a first logic AND gate having three inputs connected respectively to said clock, to said binary outputs of said comparison means through a first invertor, and to the output of said third means for decoding the second state of said counter through a second inverter, and wherein said second means for the forced setting of said binary counter in the first state comprise a second logic AND gate having two inputs connected respectively to said block and to the output of said logic OR gate connected to said third means for decoding said second means of said binary counter and to the output of said comparison means.

4. A device according to claim 1, wherein said control means further comprises an auxiliary flip-flop controlled by said clock and by each of the binary comparison signals from the output of said comparison means, and second logic means connecting the outputs of said binary counter and of said auxiliary flip-flop with said generating means for controlling the step-by-step variation of said variable comparison voltage in a first direction from said first predetermined level to a second minimum level and further in a second opposite direction from said first predetermined level to a third maximum level.

5. A device according to claim 4, wherein said second logic means includes a plurality of logic NAND gates, a first of said plurality of NAND gates being connected with said auxiliary flip-flop, said first NAND gate having inputs connected respectively to the input and to the direct output of said auxiliary flip-flop, and a second and third of said plurality of NAND gates being connected with said binary counter, said second and third NAND gates having their respective first inputs connected to reverse outputs of said binary counter and their second inputs connected in common to said first NAND gate.

6. A device according to claim 5, further comprising a third AND gate for inhibiting said first means to control the evolution of said binary counter from said first state to said second state, said third AND gate being connected between said clock and said first means and being controlled by a reverse output of said auxiliary flip-flop.

7. A device according to claim 1, wherein said generating means comprises at least two transistors, said transistors controlled respectively by the logic levels of the outputs of said control means, each of said transistors being connected as a switch between a source of constant voltage V and ground with an assembly of resistive networks connecting said transistors to an output of said generating means.

8. A device according to claim 7, wherein said control means further comprises an auxiliary flip-flop controlled by said clock and by each of the binary comparison signals from the output of said comparison means, and second logic means connecting the outputs of said binary counter and of said auxiliary flip-flop with said generating means for controlling the step-by-step variation of said variable comparison voltage in a first direction from said first predetermined level to a second minimum level and further in a second opposite direction from said first predetermined level to a third maximum level.

9. A device according to claim 8, wherein said second logic means includes a plurality of logic NAND gates, a first of said plurality of NAND gates being connected with said auxiliary flip-flop, said first NAND gate having inputs connected respectively to the input and to the direct output of said auxiliary flip-flop, and a second and third of said plurality of NAND gates being connected with said binary counter, said second and third NAND gates having their respective first inputs connected to reverse outputs of said binary counter and their second inputs connected in common to said first NAND gate.

10. A device according to claim 9, further comprising a third AND gate for inhibiting said first means to control the evolution of said binary counter from said first state to said second state, said third AND gate being connected between said clock and said first means and being controlled by a reverse output of said auxiliary flip-flop.

11. A device according to claim 7, wherein said binary counter includes at least two flip-flops connected as a master-slave unit controlling a step-by-step variation in decreasing values of said variable comparison voltage starting from said first level up to said second level corresponding to the maximum threshold of the representative voltage of a white tint, thereby enabling coding of data with at least four different tints.

12. A device according to claim 11, wherein said control means further comprises an auxiliary flip-flop controlled by said clock and by each of the binary comparison signals from the output of said comparison means, and second logic means connecting the outputs of said binary counter and of said auxiliary flip-flop with said generating means for controlling the step-by-step variation of said variable comparison voltage in a first direction from said first predetermined level to a second minimum level and further in a second opposite direction from said first predetermined level to a third maximum level.

13. A device according to claim 12, wherein said second logic means includes a plurality of logic NAND gates, a first of said plurality of NAND gates being connected with said auxiliary flip-flop, said first NAND gate having inputs connected respectively to the input and to the direct output of said auxiliary flip-flop, and a second and third of said plurality of NAND gates being connected with said binary counter, said second and third NAND gates having their respective first inputs connected to reverse outputs of said binary counter and their second inputs connected in common to said first NAND gate.

14. A device according to claim 13, further comprising a third AND gate for inhibiting said first means to control the evolution of said binary counter from said first state to said second state, said third AND gate being connected between said block and said first means and being controlled by a reverse output of said auxiliary flip-flop.

15. A device according to claim 11, wherein said first means for controlling the evolution of said binary counter comprise a first logic AND gate having three inputs connected respectively to said clock, to said binary outputs of said comparison means through a first invertor, and to the output of said third means for decoding the second state of said counter through a second inverter, and wherein said second means for the forced setting of said binary counter in the first state comprise a second logic AND gate having two inputs connected respectively to said block and to the output of said logic OR gate connected to said third means for decoding said second means of said binary counter and to the output of said comparison means.

16. A device according to claim 15, wherein said control means further comprises an auxiliary flip-flop controlled by said clock and by each of the binary comparison signals from the output of said comparison means, and second logic means connecting the outputs of said binary counter and of said auxiliary flip-flop with said generating means for controlling the step-by-step variation of said variable comparison voltage in a first direction from said first predeterminedlevel to a second minimum level and further in a second opposite direction from said first predetermined level to a third maximum level.

17. A device according to claim 16, wherein said second logic means includes a plurality of logic NAND gates, a first of said plurality of NAND gates being connected with said auxiliary flip-flop, said first NAND gate having inputs connected respectively to the input and to the direct output of aid auxiliary flip-flop, and a second and third of said plurality of NAND gates being connected with said binary counter, said second and third NAND gates having their respective first inputs connected to reverse outputs of said binary counter and their second inputs connected in common to said first NAND gate.

18. A device according to claim 17, further comprising a third AND gate for inhibiting said first means to control the evolution of said binary counter from said first state to said second state, said third AND gate being connected between said clock and said first means and being controlled by a reverse output of said auxiliary flip-flop.

* * * * *